US 9,973,327 B2

(12) United States Patent
Qu et al.

(10) Patent No.: US 9,973,327 B2
(45) Date of Patent: May 15, 2018

(54) CONNECTIVE ASSEMBLY FOR SELECTIVELY INTERFACING A LISTENING DEVICE WITH TWO-WAY RADIO AND CELLULAR DEVICE

(71) Applicant: Anray Int'l Corporation, Orange, CA (US)

(72) Inventors: Haijuan Qu, Yorba Linda, CA (US); Liren Lin, Corona, CA (US)

(*) Notice: Subject to any disclaimer, the term of this patent is extended or adjusted under 35 U.S.C. 154(b) by 92 days.

(21) Appl. No.: 15/299,987

(22) Filed: Oct. 21, 2016

(65) Prior Publication Data

US 2017/0118003 A1  Apr. 27, 2017

Related U.S. Application Data

(60) Provisional application No. 62/246,532, filed on Oct. 26, 2015.

(51) Int. Cl.
*H04L 5/16* (2006.01)
*H04W 4/10* (2009.01)

(52) U.S. Cl.
CPC ............... *H04L 5/16* (2013.01); *H04W 4/10* (2013.01)

(58) Field of Classification Search
None
See application file for complete search history.

(56) References Cited

U.S. PATENT DOCUMENTS

| | | | |
|---|---|---|---|
| 8,095,081 B2* | 1/2012 | Vance | H04B 1/46 379/431 |
| 2012/0064845 A1* | 3/2012 | Smith | H04M 1/05 455/90.2 |
| 2015/0257177 A1* | 9/2015 | Shimizu | H04M 1/72519 455/518 |
| 2016/0150303 A1* | 5/2016 | Tan | H04W 4/10 381/334 |

* cited by examiner

*Primary Examiner* — Minh-Trang Nguyen
(74) *Attorney, Agent, or Firm* — Tommy S F Wang; Wang IP Law Group, P.C.

(57) ABSTRACT

A connective assembly for selectively interfacing a single listening device with a two-way radio and a cellular device enables selective listening therebetween from a single listening device, such as an earpiece, a throat microphone, and a prior art microphone. The assembly provides both a half-duplex and a full-duplex system that creates communication in both directions, including simultaneous connections. At least one assembly switch enables powering on and off of the assembly, and selective interfacing between the two-way radio and the cellular device. A push-to-talk button enables enable half-duplex two-way communications. A send button enables full-duplex two-way communications. A finger switch enables selective interfacing between the two-way radio and the cellular device. A full-duplex switch enables simultaneous communication between the two-way radio and the cellular phone. A clip mounts the listening device to the garment. The single listening device enables discrete listening from both the cellular device and two-way radio.

18 Claims, 8 Drawing Sheets

US 9,973,327 B2

CONNECTIVE ASSEMBLY FOR SELECTIVELY INTERFACING A LISTENING DEVICE WITH TWO-WAY RADIO AND CELLULAR DEVICE

CROSS REFERENCE TO RELATED APPLICATIONS

This application claims the benefits of USPTO Provisional Patent Application No. 62/246,532.

FIELD OF THE INVENTION

The present invention relates generally to a connective assembly for selectively interfacing a single listening device with a two-way radio and a cellular device. More so, the present invention relates to a connective assembly that selectively interfaces a two-way radio and a cellular device and enables selective listening therebetween from a single listening device; whereby the assembly provides both a half-duplex and a full-duplex system that creates communication in both directions, including simultaneous connections; whereby at least one assembly switch enables powering on and off of the assembly, and selective interfacing between the two-way radio and the cellular device; whereby a push-to-talk button enables enable half-duplex two-way communications; whereby a send button enables full-duplex two-way communications; whereby a finger switch enables selective interfacing between the two-way radio and the cellular device; and whereby a full-duplex switch enables simultaneous communication between the two-way radio and the cellular phone.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a two-way radio is a radio that can both transmit and receive (a transceiver), unlike a broadcast receiver which only receives content. The two-way radio allows the operator to have a conversation with other similar radios operating on the same radio frequency or channel. Two-way radios are available in mobile, stationary base and hand-held portable configurations. One type of two-way radio may be used as one-on-one or one-on-many regional real-time communication devices for professionals working in public safety units, enterprises, such as the police, fire department, security, medical, search-and-rescue teams, etc. This radio does not rely on communication infrastructures such as 2G/3G networks or commercial communication networks.

It is known that a push-to-talk (PTT) button is a switch on a two-way radio that enables having conversations or talking on half-duplex communication lines, including two-way radio, using a momentary button to switch from voice reception mode to transmit mode. The PTT enables a half-duplex communication system that provides communication in both directions, but only one direction at a time (not simultaneously).

Typically in a half-duplex system, once a party begins receiving a signal, it must wait for the transmitter to stop transmitting, before replying. An example of a half-duplex system is a two-party system radio, wherein one must use "over" or another previously designated keyword to indicate the end of transmission, and ensure that only one party transmits at a time, because both parties transmit and receive on the same frequency.

Quite differently, in a full duplex system, both parties can communicate with each other simultaneously. An example of a full-duplex device is a telephone. The parties at both ends of a call can speak and be heard by the other party simultaneously. The earphone reproduces the speech of the remote party as the microphone transmits the speech of the local party, because there is a two-way communication channel between them, or more strictly speaking, because there are two communication paths/channels between them.

Generally, a cellular device, such as a cellular phone, is a small computing device, typically small enough to be hand-held, having a display screen with a miniature and, in some models, a touchscreen. The cellular device typically operates on a cellular network or mobile network, where the last link is wireless. The network is distributed over land areas called cells, each served by at least one fixed-location transceiver, known as a cell site or base station.

Through the station the Multi-Functional Two-way Radio can simultaneously connect the two-way radio and the cell phone, which means the holder of the Station can communicate with the person using the cell phone as well as the person using two-way radio at the same time. In addition, the most important aspect, is that there is no cross hearing. For example, the person using the cell phone cannot hear the dialogue between the holder of Station and the person using two-way radio, and vice versa. This is because this invention is mostly used by law enforcement officers when pursuing crime.

In many instances, cellular devices have a button for establishing communication connections, typically designated send button, and also have a button for terminating communication connections, typically designated end button. To establish a connection for a conversation, a user typically enters a telephone number on a keypad, or selects a number from a stored directory of numbers, and then presses the send button. When a user receives a call, which for example, may be indicated by the telephone ringing or vibrating, typically the user presses the send button to answer the telephone and establish a connection for a conversation. To end a conversation, the user presses the end button to terminate the connection.

Communications with cellular devices are conducted in conjunction with a cellular telephone network which includes base stations, which wirelessly transmit information to, and receive information from, cellular telephones, and which are coupled to the public switched telephone network. Communications over cellular telephones are typically full-duplex, which means that both parties to the conversation can simultaneously send and receive information.

Other proposals have involved enabling communications between a two-way radio and a cellular device. The problem with these connecting devices is that they do not offer user-controlled selective interfacing between the two-way radio and cellular device. Also, the listening devices are not very discrete when worn. Even though the above cited communication connecting devices meets some of the needs of the market, a connective assembly for selectively interfacing a single listening device with a two-way radio and a cellular device that selectively interfaces a two-way radio and a cellular device and enables selective listening therebetween from a single listening device; whereby the assembly provides both a half-duplex and a full-duplex system that creates communication in both directions, including simultaneous connections is still desired.

SUMMARY

Illustrative embodiments of the disclosure are generally directed to a connective assembly for selectively interfacing a listening device with a two-way radio and a cellular device. The assembly serves to enable selective interfacing between a two-way radio and a cellular device, which allows a user to control listening between the two-way radio and cellular device from a single listening device. The assembly seamlessly couples the two-way radio with the cellular device, and can utilize alternate communication methods as an intermediate step in connecting with an uncompromised cellular network. The assembly also provides discrete donning of a single listening device, for enabling discrete operation of the assembly.

In some embodiments, the assembly provides a single listening device, such as an earphone, an IPHONE® earbud, a throat microphone, a microphone, a speaker, or a prior art microphones to be worn by a user. Each listening device is operable on a single ear and creates discrete application of the listening device for listening to the two-way radio and the cellular device. This may be useful for law enforcement officials who require discretion when communicating.

The assembly provides a housing that contains a circuit board that regulates electrical transmissions and frequency ranges between the two-way radio, cellular device, and listening device. A first cable terminating at an audio plug is configured to couple with the cellular device. A radio coupling mechanism is configured to directly couple with the two-way radio. A second cable terminates at the listening device.

Thus, a nexus forms between the two-way radio and the cellular device, with selective listening from each at the listening device. Electronic transmissions travel through the first cable and radio coupling mechanism to the circuit board for processing before being transmitted to the listening device. Those skilled in the art will recognize that standard communication transmission means known in the art may be used for this purpose.

The assembly further provides numerous means for enabling selective talking and listening between the two-way-radio and the cellular device. In one embodiment, the assembly employs both a half-duplex system, and a full-duplex system to allow communication in both directions between two-way radio and cellular device, including simultaneous connections therebetween. The half-duplex system is the natural function, with the full-duplex system actuated through a switch.

Further, the assembly comprises at least one assembly switch that enables powering on and off of the assembly, and selective interfacing between the two-way radio and the cellular device. The assembly switch comprises a push-to-talk button configured to enable half-duplex two-way communications. The push-to-talk button may be wireless. The assembly switch further comprises a push-to-talk button configured to enable half-duplex two-way communications.

The assembly further comprises a finger switch that is operatively donned on the finger. The finger switch enables selective interfacing between the two-way radio and the cellular device. The assembly further comprises a full-duplex switch that enables simultaneous communication between the two-way radio and the cellular phone.

In one aspect, an assembly for selectively interfacing a single listening device with a two-way radio and a cellular device, comprises:
- a circuit board configured to regulate half-duplex communications and full-duplex communications for the assembly;
- a processing chip configured to process a frequency attuned to the circuit board;
- a first cable operatively connected to the circuit board and terminating at an audio plug, the audio plug configured to enable operational coupling of the assembly to a cellular device;
- a radio coupling mechanism operatively connected to the circuit board and configured to enable operational coupling of the assembly to a two-way radio;
- a second cable operatively connected to the circuit board and terminating at a listening device, the listening device configured to selectively listen to communications from the cellular device, or the two-way radio, or both;
- at least one assembly switch operatively connected to the circuit board, the at least one assembly switch configured to enable powering on and off of the assembly, the at least one assembly switch further configured to enable selective interfacing between the two-way radio and the cellular device,
- the at least one assembly switch comprising a push-to-talk button configured to enable half-duplex two-way communications,
- the at least one assembly switch further comprising a send button configured to enable full-duplex simultaneous communications;
- a finger switch configured to enable selective interfacing between the two-way radio and the cellular device, the finger switch further configured to enable operative donning to the finger,
- whereby the finger switch is operable as the push-to-talk button for half-duplex two-way communications, and operable as the send button for full-duplex simultaneous communications;
- a full-duplex switch configured to enable simultaneous communications between the two-way radio, the cellular phone, and the listening device,
- whereby the full-duplex switch functions as the send button for full-duplex simultaneous communications;
- a first transistor operatively attached to the circuit board and electrically coupled to the first cable, wherein the first transistor is electrically coupled to the cellular device through the first cable;
- a second transistor operatively attached to the circuit board and electrically coupled to the radio coupling mechanism, wherein the second transistor is electrically coupled to the two-way radio through the radio coupling mechanism; and
- a housing configured to contain the circuit board, the processing chip, the first transistor, and the second transistor.

In another aspect, the cellular device is a cellular telephone.

In another aspect, the two-way radio is a two-party radio.

In another aspect, the listening device includes at least one of the following: an earphone, an earbud, a throat microphone, a microphone, and a speaker.

In another aspect, the assembly further comprises an antenna.

In another aspect, the assembly further comprises an audio amplifier attached to the circuit board and electrically coupled to the second cable, wherein the audio amplifier is electrically coupled to the listening device.

In another aspect, the finger switch is wireless.

In another aspect, a finger cord operatively attaches the finger switch to the circuit board.

In another aspect, the push-to-talk button is wireless.

In another aspect, the assembly further comprises a clip configured to attach the second cable to an object.

One objective of the present invention is to permit using a hands-free assembly with a combination cellular device/two-way radio, and also permits controlling both the send and end cellular device functions, and the push-to-talk two-way radio function, of the combination cellular device/two-way radio with a single switch.

Another objective is to enable discrete listening to both a two-way radio and a cellular phone by law enforcement officials through the use of a single listening device, such as a small earpiece.

Another objective is to allow for selective communications between the two-way radio and the cellular device, one-way, non-simultaneously two-ways, or simultaneously both ways.

Yet another objective is to enable various types of listening devices to be coupled to the assembly.

Yet another objective is to provide a wireless finger switch that allows for simultaneous communications between the two-way radio, the cellular phone, and the listening device.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 3 is a throat microphone working with the Station. This type of microphone hangs around people's neck. #302 will be attached to the neck. When talking, #302 can detect the vibration frequency, in accordance with an embodiment of the present invention;

FIG. 4 is a hidden headset microphone used by Police Officers. It can work with the Station as well. in accordance with an embodiment of the present invention;

FIG. 5 is a Circuit diagram of Station. Station receives the audio input from both two-way radio and cell phone. Station will transmit the audio output to the two-way radio and cell phone after processing. In the future, the Station may be able to handle multiple radios and cell phones at the same time, in accordance with an embodiment of the present invention;

FIG. 6 is a Station with a headphone and wireless finger PTT. in accordance with an embodiment of the present invention;

DETAILED DESCRIPTION OF THE INVENTION

Figure 1:
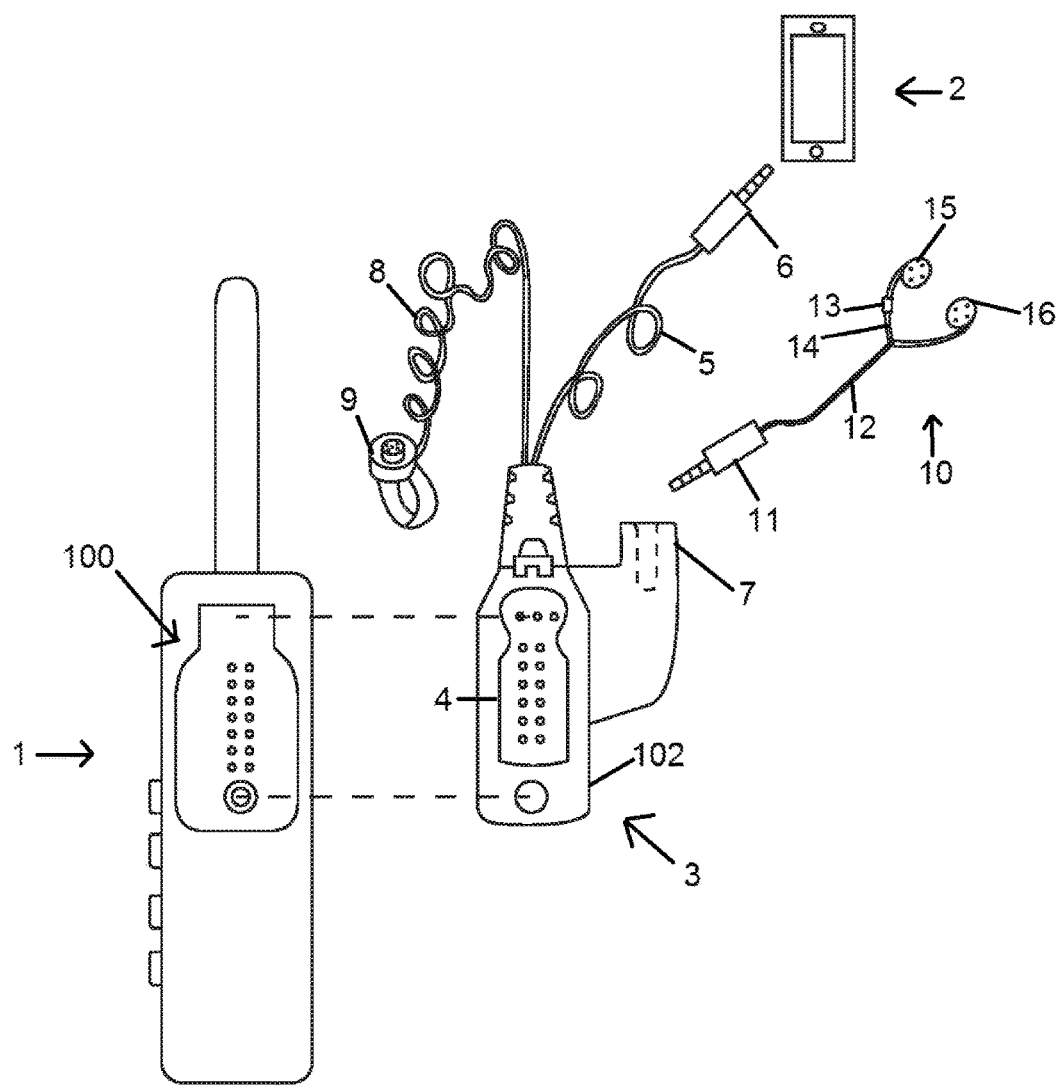
FIG. 1 illustrates a frontal view of an exemplary assembly for selectively interfacing a single listening device with a two-way radio and a cellular device, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An assembly 100 for selectively interfacing a single listening device with a two-way radio and a cellular device is referenced in FIGS. 1-8. In one possible embodiments, FIG. 1 may include a typical schematic figure of the invention: "Station".

In some embodiments, #1 is a two-way radio.

In some embodiments, #2 is a cell phone.

In some embodiments, #3 is a Station with a connector.

In some embodiments, #4 is the connector that is used to connect the Station and the two-way radio. The shape of the connector depends on the model of the two-way radio.

In some embodiments, #5 is a cable which connects a cell phone and Station.

In some embodiments, #6 is a connector to a cell phone, different cell phones will have different connector.

In some embodiments, #7 is a socket for a headphone and microphone. No. 7 can connect different types of headphones.

In some embodiments, #8 is a cable which connects Station and finger PTT.

In some embodiments, #9 is a finger PTT.

In some embodiments, #10 is a headphone with a microphone.

In some embodiments, #12 is the cable of the headphone.

In some embodiments, #13 is a microphone.

In some embodiments, #14 is a phone switch that can answer or hang up the phone.

In some embodiments, #15 is an earbud.

In some embodiments, #16 is a second earbud.

In some embodiments, #17 is an audio processor, which can transfer the vibration frequency to voice. #17 is also a switch of the phone. This type of microphone is usually applied to chemistry soldiers who must wear gas masks.

As referenced in FIG. 1, the connective assembly 100 for selectively interfacing a listening device with a two-way radio and a cellular device, hereafter "assembly 100" is configured to enable selective interfacing between a two-way radio 202 and a cellular device 2. Looking now at FIG. 2, the assembly 100 provides various switches and buttons that enables a user to selectively communicate in both a half-duplex and a full-duplex transmission of data between the two-way radio 202, the cellular device 2, and a single, discretely positioned, listening device 112. In this manner, a user may selectively listen and talk with both the two-way radio 202 and the cellular device 2, one at a time, or simultaneously.

Thus, the assembly 100 enables selective communication between the two-way radio 202, the cellular device 2, and a single, discretely positioned listening device 112. The assembly 100 seamlessly couples the two-way radio 202 with the cellular device 2, and can utilize alternate communication methods as an intermediate step in connecting with an uncompromised cellular network to enable listening from both the two-way radio 202 and cellular device 2 through the listening device 112.

Those skilled in the art will recognize that the two-way radio 202 may include a radio that can both transmit and receive (a transceiver), unlike a broadcast receiver which only receives content. The two-way radio 202, or transceiver, allows the operator to have a conversation with other similar radios operating on the same radio frequency or channel. Two-way radios are available in mobile, stationary base and hand-held portable configurations. Any type of two-way radio known in the art may be used.

In some embodiments, the two-way radio 202 may operate on numerous frequencies. Typically channelized operations are used, so that operators need not tune equipment to a particular frequency but instead can use one or more pre-selected frequencies, easily chosen by a dial, a pushbutton or other switching mechanism. For example, in the United States, there is a block of 5 channels (pre-selected radio frequencies) that are allocated to the Multiple Use Radio System.

Those skilled in the art will also recognize that a cellular device 2 is a small computing device, typically small enough to be handheld, having a display screen with a miniature and, in some models, a touchscreen. In some embodiments, the cellular device 2 may operate on a cellular network or mobile network, where the last link is wireless. The network is distributed over land areas called cells, each served by at least one fixed-location transceiver, known as a cell site or base station. This base station provides the cellular device 2 with the network coverage which can be used for transmission of voice, data and others.

Figure 3:
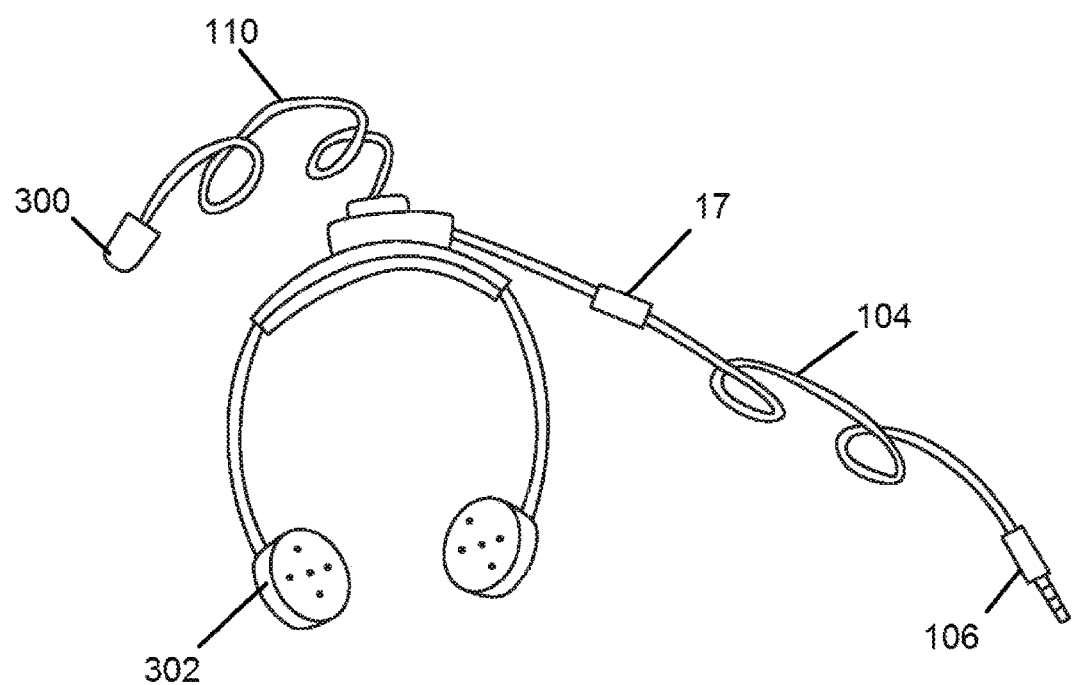
FIG. 3 illustrates a frontal view of an assembly having a listening device of the type, a throat microphone and an earbud, whereby
Figure 4:
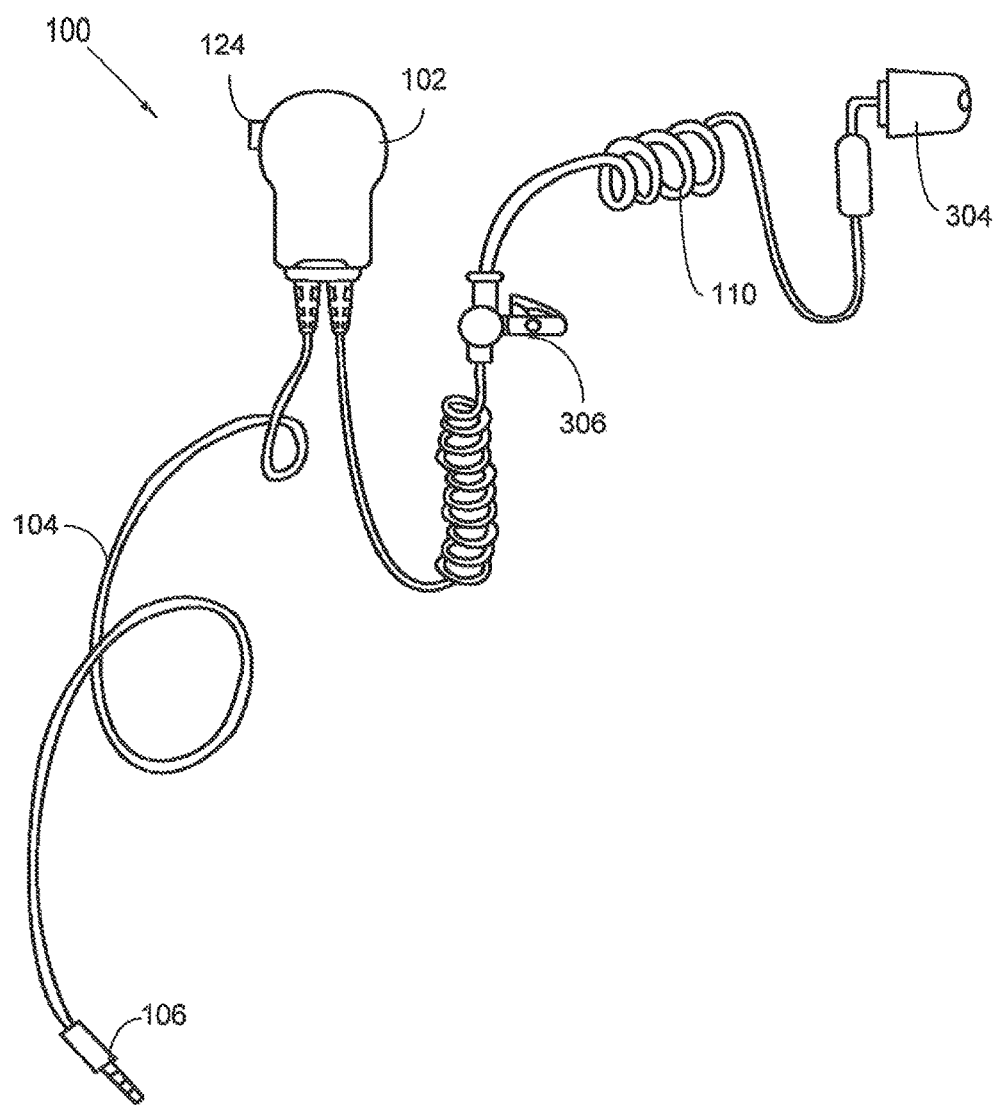
FIG. 4 illustrates a frontal view of an assembly having a listening device of the type, a prior art listening device, whereby

As shown in FIGS. 3 and 4, the listening device 112 is the third component of the assembly 100. The listening device 112 may include a single listening device that discretely hides in the ear of the user. Those skilled in the art will recognize that law enforcement officials may require such discrete communication, especially during undercover operations. Thus, the listening device 112 may include a single earphone 300, an IPHONE® earbud, a throat microphone 302, a microphone, a speaker, or a prior art microphones 304 to be worn by a user.

In this manner, each type of listening device 112 is operable and worn discretely inside a single ear for discrete and selective listening to the two-way radio 202, or the cellular device 2, or both. Thus, a nexus forms between the two-way radio 202 and the cellular device 2, with selective listening from each at a listening device 112. In an exemplary operational use, electronic audio signals travel through the first cable 104 and radio coupling mechanism 108 to the circuit board 500 for processing before being transmitted to the listening device 112. Those skilled in the art will recognize that standard communication transmission means known in the art may be used for this purpose.

Figure 5:
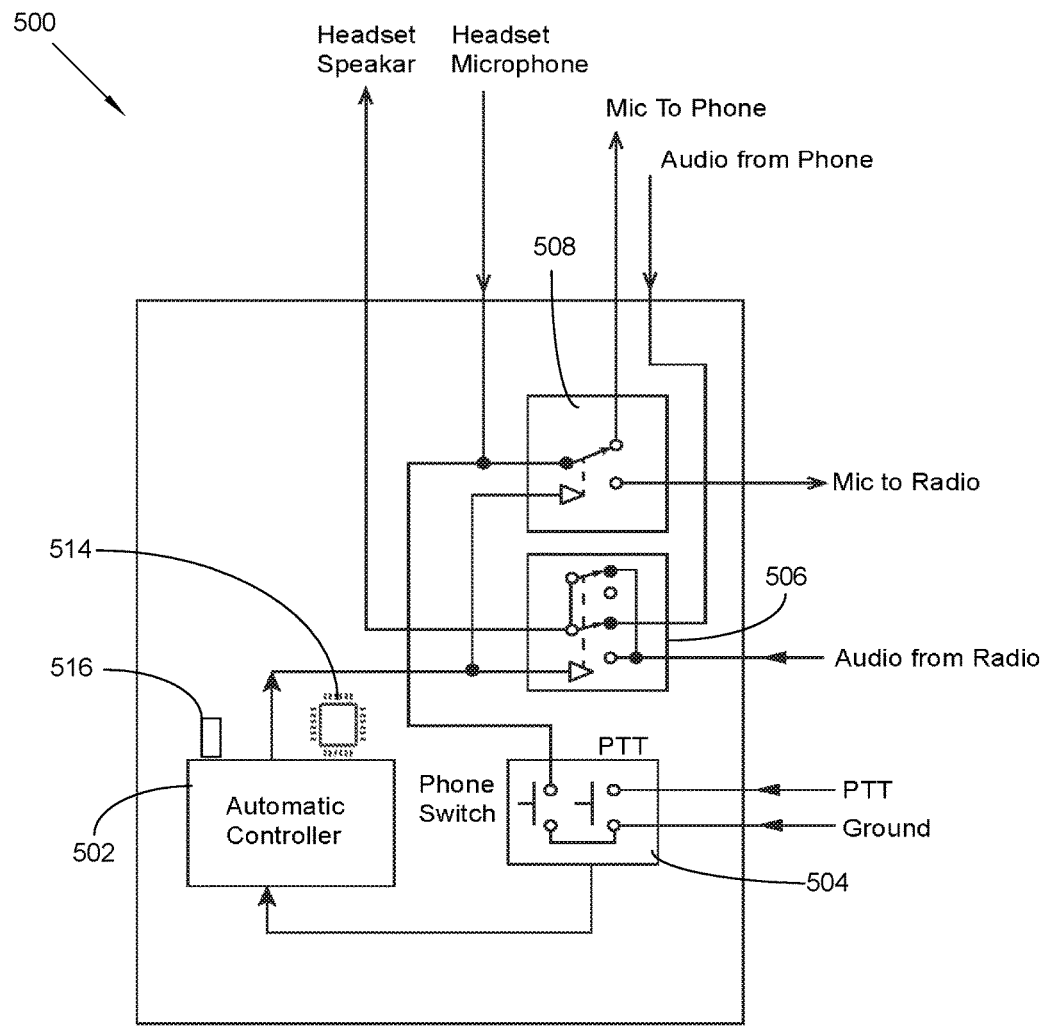
FIG. 5 illustrates an exemplary circuit board for regulating half-duplex communications and full-duplex communications for the assembly, where

Turning now to FIG. 5, the assembly 100 comprises a circuit board 500 configured to regulate communications between the two-way radio 202 and the cellular device 2; and especially selective interchanging between half-duplex communications and full-duplex communications. In one embodiment, the circuit board 500 is a printed circuit board 500 that mechanically supports and electrically connects electronic components using conductive tracks, pads and other features etched from copper sheets laminated onto a non-conductive substrate.

Typical components on the circuit board 500 may include capacitors, resistors or active devices that are generally soldered on the circuit board 500. A processing chip 514 may operatively attach to the circuit board 500. The processing chip 514 is configured to process at least one frequency attuned to the circuit board 500. The circuit board 500 may also include an antenna 516 that is configured to receive the desired frequencies.

In other embodiments of the circuit board 500, a cellular switch 504 may be used to switch signals to and from the cellular device 2. A radio switch 506 may switch signals to and from the two-way radio 202. A push-to-talk switch 504 may also be utilized to enable half and full duplex data transmission through a push to talk button 9 or 116. Further, an automatic controller 502 regulates the various switches 504, 506, 508.

Figure 6:
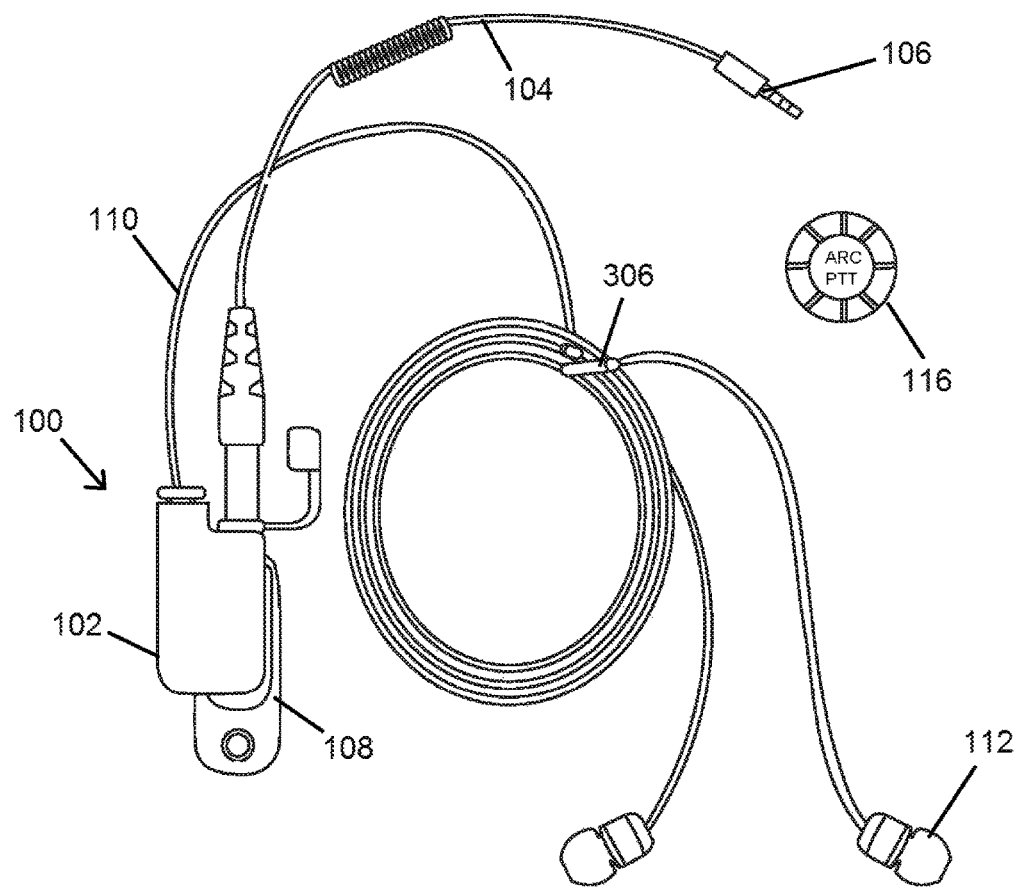
FIG. 6 illustrates a perspective view of the assembly shown in FIG. 1, where

Looking now at FIG. 6, the assembly 100 provides a housing 102 that contains the circuit board 500, and the processing chip 514. The housing 102 may include a rigid polymer that inhibits moisture from entering the circuit board 500.

In some embodiments, a first cable 104 is operatively connected to the circuit board 500 and terminates at an audio plug 106. The audio plug 106 is configured to enable operational coupling of the assembly 100 to a cellular device 2. In one embodiment, the audio plug 106 comprises an electrical connector that is effective for connections to send and receive analog signals, and primarily audio signals. In one embodiment, the audio plug 106 is cylindrical in shape, having between two to five contacts.

Figure 7:
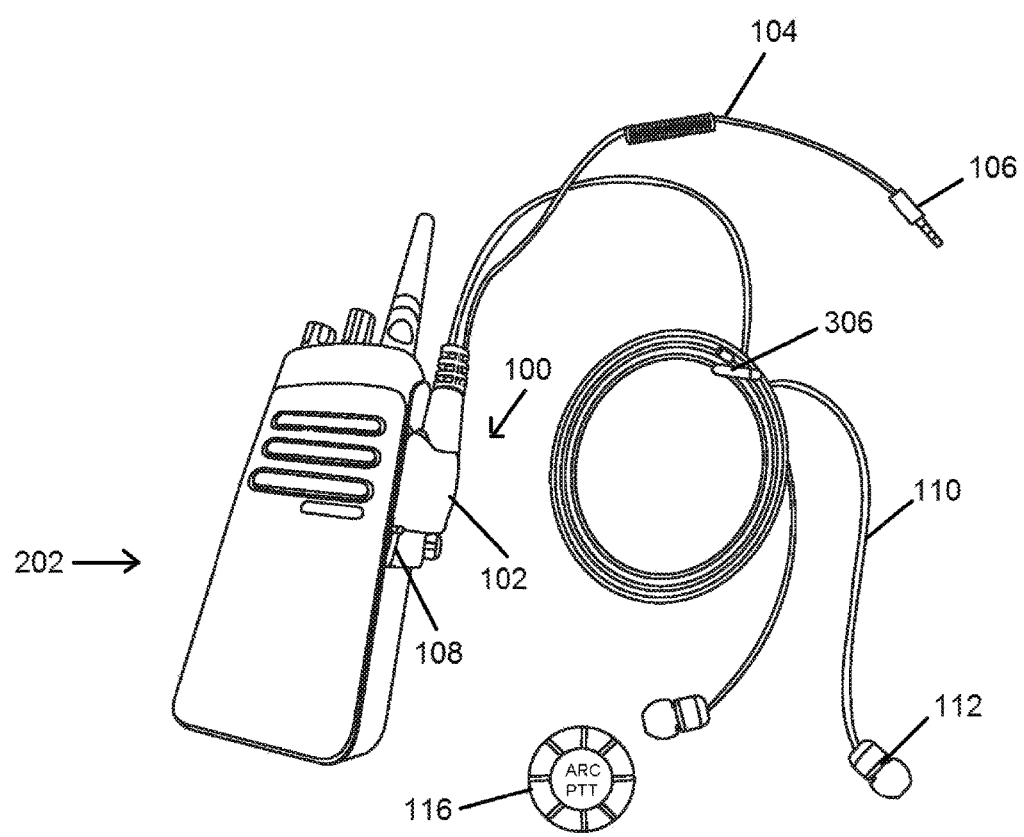
FIG. 7 illustrates a perspective view of the assembly shown in FIG. 1 operatively connected to a two-way radio, in accordance with an embodiment of the present invention.

As shown in FIG. 7, a radio coupling mechanism 108 is operatively connected to the circuit board 500. The radio coupling mechanism 108 is configured to enable operational coupling of the assembly 100 to a two-way radio 202. The two-way radio 202 may include a port having multiple connectors and protrusions designed to mate with the radio coupling mechanism 108. In some embodiments, a second transistor operatively attaches to the circuit board 500 and electrically couples to the radio coupling mechanism 108. The second transistor electrically couples to the two-way radio 202 through the radio coupling mechanism 108.

In some embodiments, a second cable 110 operatively connects to the circuit board 500. The second cable 110 terminates at a listening device 112. The listening device 112 is configured to enable selective listening of communications from the cellular device 2, or the two-way radio 202, or both.

Figure 8:
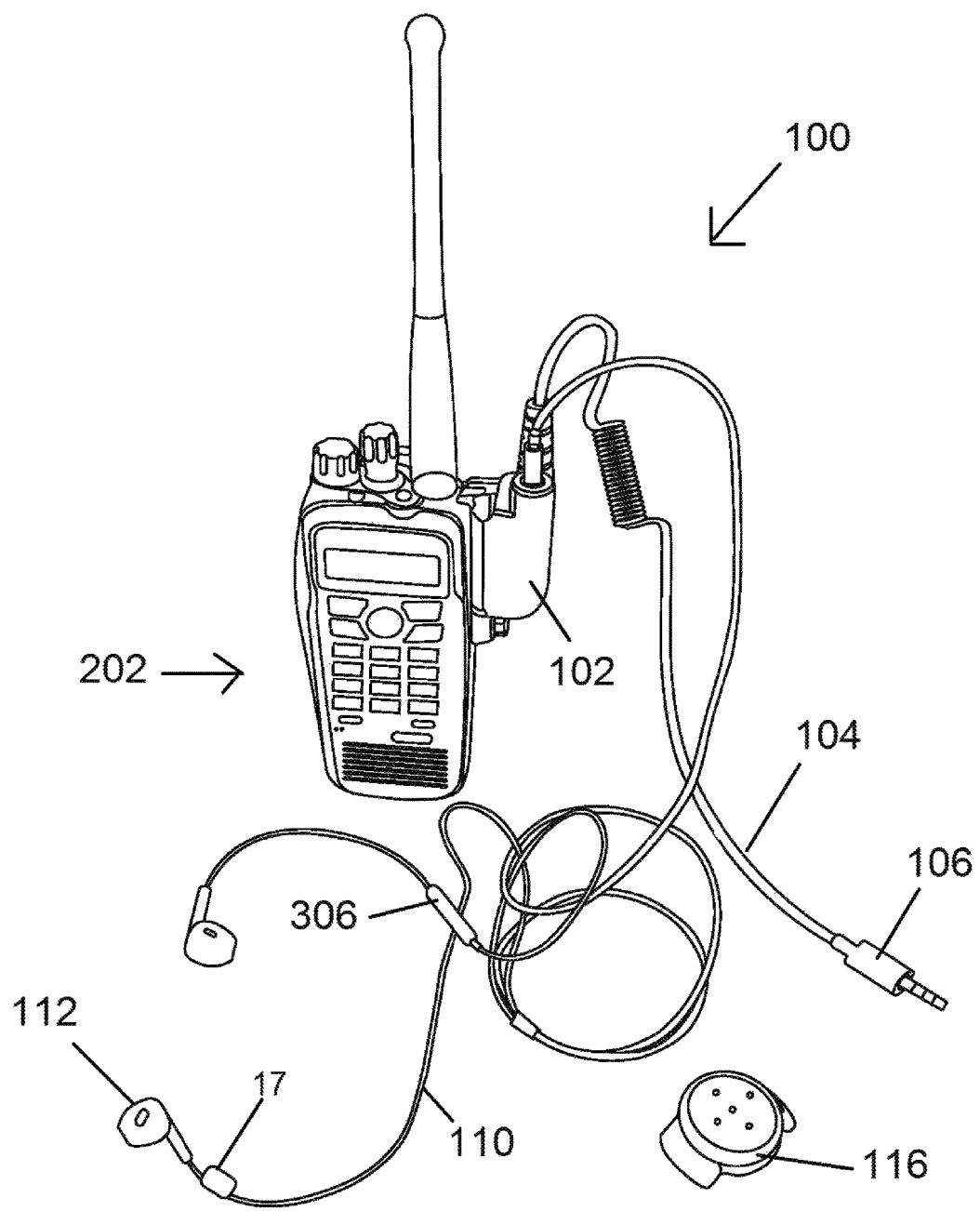
FIG. 8 illustrates a perspective view of the assembly shown in FIG. 1 operatively connected to a two-way radio, and illustrating earbuds, in accordance with an embodiment of the present invention Like reference numerals refer to like parts throughout the various views of the drawings.

As discussed above, the assembly 100 provides a single listening device 112 configured to be worn in a discrete manner by a user. The listening device 112 is operable on a single ear and creates discrete application for listening to the two-way radio 202 and the cellular device 2. This may be useful for law enforcement officials who require discretion when communicating. In some embodiments, a clip 306 may be used to attach the listening device 112 to a garment and to create discrete carrying of the listening device 112. FIG. 8 illustrates a perspective view of the single listening device 112 operatively connected to a two-way radio in the form of earbuds.

Figure 2:
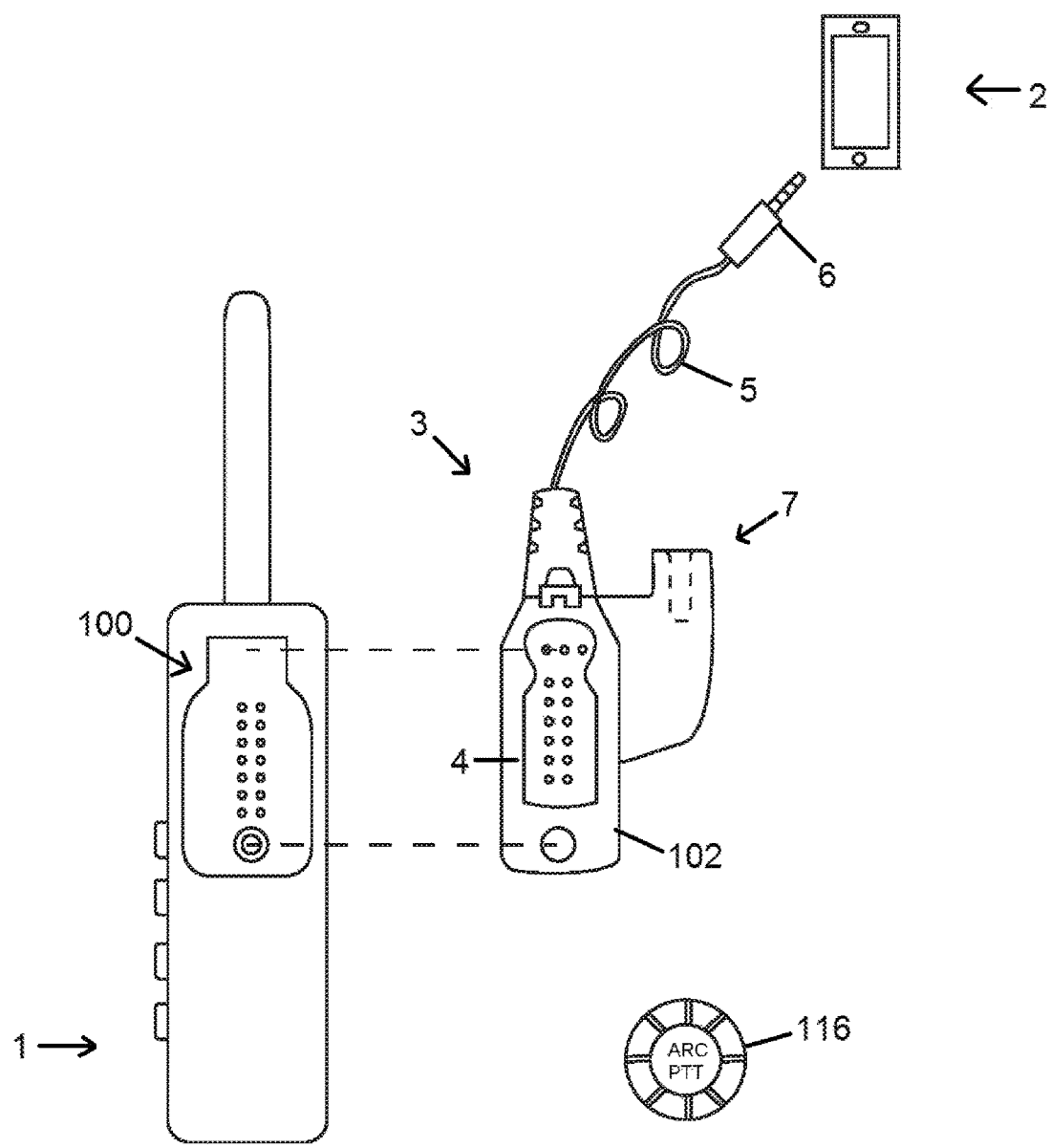
FIG. 2 illustrates a frontal view of the assembly shown in FIG. 1, including a finger switch for selective interfacing between the two-way radio and the cellular device, in accordance with an embodiment of the present invention.

Looking again at FIG. 2, the assembly 100 further provides numerous means for enabling selective talking and listening between the two-way-radio 202 and the cellular device 2. In one embodiment, the assembly 100 employs both a half-duplex system, and a full-duplex system to allow communication in both directions between two-way radio 202 and cellular device 2. The half-duplex system is the natural function, with the full-duplex system actuated through a full-duplex switch 124, which enables simultaneous connections between the two-way-radio 202 and the cellular device 2.

As shown back in FIG. 1, a finger switch 9 enables selective interfacing between the two-way radio 202 and the cellular device 2, the finger switch 9 may be operatively wrapped around the finger. The finger switch 9 enables selective interfacing between the two-way radio 202 and the cellular device 2. In this manner, the finger switch 9 is operable as the push-to-talk button 116 for half-duplex two-way communications, and operable as the send button 118 for full-duplex simultaneous communications. The finger switch 9 may be wireless or operatively attached to the circuit board 500 through a finger cord 8, as shown in FIG. 1.

The assembly 100 further comprises a full-duplex switch 124 that enables simultaneous communication between the two-way radio 202 and the cellular device 2. The full-duplex switch 124 enables simultaneous communications between the two-way radio 202, the cellular device 2, and the listening device 112. In an alternative embodiment, the assembly 100 comprises an audio amplifier attached to the circuit board 500 and electrically coupled to the second cable 110. The audio amplifier is electrically coupled to the listening device 112 to amplify the volume and clarity of audio.

The user first presses the push-to-talk button 9 attached to the first cable 8, to instruct the two-way radio 202 to transmit in a half-duplex communications mode for a two-way radio 202 conversation. However in some embodiments, the push-to-talk button 116 is wireless and may be carried discretely by the user.

In operation of the push-to-talk button 116, the user speaks while continuing to press the push-to-talk button 116, so as to transmit the user's words in the two-way radio 202 conversation. Next, the user releases the push-to-talk button 116, to instruct the cellular device 2 and two-way radio 202 to cease transmitting, to permit the user to hear the words transmitted by the other party to the two-way radio 202 conversation.

In some examples, after completing the two-way radio conversation, the user may answer an incoming cellular telephone call by pressing the full-duplex switch 124 used during the two-way radio conversation, to instruct the cellular device 2 and two-way radio 202 to establish communications for a full duplex cellular telephone conversation.

In exemplary use of the listening device 112, a two-way communication earpiece provides a small, inconspicuous, and comfortable earpiece which fits behind the ear for sound delivery and pickup. The earpiece may be used with a variety of communication devices, such as telephones, cellular telephones, two-way radios, radios, tape players, CD players, and televisions.

In another exemplary use, the earpiece is configured to be received behind the ear of a user with a sound delivery tube extending from behind the ear into the ear canal of the user. An ear tip positioned on the sound delivery tube is preferably a non-occluding type ear tip which allows ambient sound to enter the ear canal around the ear tip. A microphone is positioned on the earpiece above the ear for voice pickup. In this manner, discrete and selective communication be law enforcement officials is permitted through both the cellular device 2 and the two-way radio 202.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An assembly for selectively interfacing a single listening device with a two-way radio and a cellular device, the assembly comprising:
    a circuit board configured to regulate half-duplex communications and full-duplex communications for the assembly;
    a processing chip configured to process a frequency attuned to the circuit board;
    a first cable operatively connected to the circuit board and terminating at an audio plug;
    a radio coupling mechanism operatively connected to the circuit board;
    a second cable operatively connected to the circuit board and terminating at a listening device, the listening device configured to enable selective listening through the first cable or the radio coupling mechanism, or both;
    at least one assembly switch operatively connected to the circuit board, the at least one assembly switch configured to enable powering on and off of the assembly, the at least one assembly switch further configured to enable selective communication through the first cable or the radio coupling mechanism, or both,
    the at least one assembly switch comprising a push-to-talk button configured to enable half-duplex two-way communications through the first cable or the radio coupling mechanism, or both,
    the at least one assembly switch further comprising a send button configured to enable full-duplex simultaneous communications through the first cable or the radio coupling mechanism, or both;
a finger switch configured to enable selective communications through the first cable or the radio coupling mechanism, or both, the finger switch further configured to enable operative donning to the finger,
whereby the finger switch is operable as the push-to-talk button for half-duplex two-way communications, and operable as the send button for full-duplex simultaneous communications;
a full-duplex switch configured to enable simultaneous communications through the first cable and the radio coupling mechanism;
a housing configured to contain the circuit board and the processing chip.

2. The assembly of claim 1, wherein the cellular device is a cellular telephone.

3. The assembly of claim 1, wherein the two-way radio is a two-party radio.

4. The assembly of claim 1, wherein the listening device includes at least one of the following:
an earphone, an earbud, a throat microphone, a microphone, and a speaker.

5. The assembly of claim 1, wherein the circuit board includes at least one of the following:
an antenna, an automatic controller, a phone switch, a radio switch, and a push to talk switch.

6. The assembly of claim 1, further comprising an audio amplifier operatively attached to the circuit board and electrically coupled to the second cable, the audio amplifier electrically coupled to the listening device.

7. The assembly of claim 1, wherein the finger switch is wireless.

8. The assembly of claim 1, wherein the finger switch operatively attaches to the circuit board through a finger cord.

9. The assembly of claim 1, further comprising a clip configured to enable mounting of the second cable, or the listening device, or both.

10. The assembly of claim 1, wherein the audio plug is configured to enable operational coupling of the assembly to a cellular device.

11. The assembly of claim 10, wherein the radio coupling mechanism is configured to enable operational coupling of the assembly to a two-way radio.

12. The assembly of claim 11, wherein the listening device is configured to enable selective listening to communications from the cellular device, or the two-way radio, or both.

13. The assembly of claim 12, wherein the at least one assembly switch is configured to enable selective interfacing and communications between the two-way radio and the cellular device.

14. The assembly of claim 13, wherein the finger switch is configured to enable selective interfacing and communications between the two-way radio and the cellular device.

15. The assembly of claim 14, wherein the full-duplex switch is configured to enable simultaneous communications between the two-way radio, the cellular phone, and the listening device.

16. The assembly of claim 1, wherein the push-to-talk button is wireless.

17. An assembly for selectively interfacing a single listening device with a two-way radio and a cellular device, the assembly comprising:
a circuit board configured to regulate half-duplex communications and full-duplex communications for the assembly, the circuit board comprising at least one of the following: an antenna, an automatic controller, a phone switch, a radio switch, and a push to talk switch;
a processing chip configured to process a frequency attuned to the circuit board;
a first cable operatively connected to the circuit board and terminating at an audio plug, the audio plug configured to enable operational coupling of the assembly to a cellular device;
a radio coupling mechanism operatively connected to the circuit board and configured to enable operational coupling of the assembly to a two-way radio;
a second cable operatively connected to the circuit board and terminating at a listening device, the listening device configured to selectively listen to communications from the cellular device, or the two-way radio, or both;
at least one assembly switch operatively connected to the circuit board, the at least one assembly switch configured to enable powering on and off of the assembly, the at least one assembly switch further configured to enable selective interfacing between the two-way radio and the cellular device,
the at least one assembly switch comprising a push-to-talk button configured to enable half-duplex two-way communications,
the at least one assembly switch further comprising a send button configured to enable full-duplex simultaneous communications;
a finger switch configured to enable selective interfacing between the two-way radio and the cellular device, the finger switch further configured to enable operative donning to the finger,
whereby the finger switch is operable as the push-to-talk button for half-duplex two-way communications, and operable as the send button for full-duplex simultaneous communications;
a finger cord configured to operatively attach the finger switch to the circuit board;
a full-duplex switch configured to enable simultaneous communications between the two-way radio, the cellular phone, and the listening device,
whereby the full-duplex switch functions as the send button for full-duplex simultaneous communications;
a first transistor operatively attached to the circuit board and electrically coupled to the first cable, wherein the first transistor is electrically coupled to the cellular device through the first cable;
a second transistor operatively attached to the circuit board and electrically coupled to the radio coupling mechanism, wherein the second transistor is electrically coupled to the two-way radio through the radio coupling mechanism;
a housing configured to contain the circuit board, the processing chip, the first transistor, and the second transistor; and
a clip configured to enable mounting of the second cable, or the listening device, or both.

18. The assembly of claim 17, wherein the listening device includes at least one of the following: an earphone, an earbud, a throat microphone, a microphone, and a speaker.

* * * * *